(12) United States Patent
Cohen et al.

(10) Patent No.: US 6,873,799 B2
(45) Date of Patent: Mar. 29, 2005

(54) OPTICAL SUBASSEMBLY FOR OPTICAL COMMUNICATIONS

(75) Inventors: Mitchell Simmons Cohen, Bedford, MA (US); David Peter Gaio, Rochester, MN (US); William K. Hogan, Rochester, MN (US); Glen Walden Johnson, Yorktown Heights, NY (US); Jeannine Madelyn Trewhella, Peekskill, NY (US)

(73) Assignee: JDS Uniphase Corporation, San Jose, CA (US)

( * ) Notice: Subject to any disclaimer, the term of this patent is extended or adjusted under 35 U.S.C. 154(b) by 580 days.

(21) Appl. No.: 09/885,683

(22) Filed: Jun. 20, 2001

(65) Prior Publication Data

US 2002/0196500 A1 Dec. 26, 2002

(51) Int. Cl.[7] .............................................. H04B 10/00
(52) U.S. Cl. ....................... 398/135; 398/128; 398/138
(58) Field of Search ................................ 398/139, 138, 398/135; 385/14, 92; 372/66

(56) References Cited

U.S. PATENT DOCUMENTS

| | | | | |
|---|---|---|---|---|
| 4,733,094 A | * | 3/1988 | Carpentier et al. | ......... 250/551 |
| 5,617,212 A | * | 4/1997 | Stuart | ........................ 356/438 |
| 5,671,077 A | * | 9/1997 | Imakawa et al. | ........... 359/204 |
| 5,808,769 A | * | 9/1998 | Kerklaan et al. | ........... 398/131 |

* cited by examiner

Primary Examiner—Jason Chan
Assistant Examiner—Agustin Bello
(74) Attorney, Agent, or Firm—Allen, Dyer, Doppelt, Milbrath & Gilchrist, P.A.

(57) ABSTRACT

An optical signal transceiver subassembly is mounted on a lead frame for further attachment to an electronic printed circuit board. The optical subassembly is comprised of a solid-state laser, a pair of photo-detectors, an over-mold of transparent material having shapes forming the exposed surface thereof, the surface and a selective silvering of a portion thereof defining a beam-splitter mirror and an interior reflective focusing surface, preferably in the shape of a partial cylindrical surface. The beam-splitter mirror is lightly silvered and the cylindrical surface is silvered to enhance the reflection of the laser beam. The optical subassembly is further enclosed with a housing incorporating a pair of lenses and alignment pins. The lenses focus the data stream of optical light signals onto the end of the outgoing optical fiber and the data stream of optical light signals from the incoming optical fiber onto and through the beam-splitter and onto a first photo-detector. The beam-splitter and the partial cylindrical surface reflect the laser beam portion deflected from the primary laser beam path onto a second photo-detector to provide a data stream from which the operation of the laser may be monitored, thereby insuring the proper transmission of the data signals provided to the laser through the lead frame and its associated electronic connections.

11 Claims, 7 Drawing Sheets

OPTICAL SUBASSEMBLY FOR OPTICAL COMMUNICATIONS

FIELD OF THE INVENTION

This invention relates to optical communication devices and, more specifically, to the optical signal transceiver units that produce and receive optical signals in a digital format for data communications.

BACKGROUND OF THE INVENTION

Optical transceivers for generating and receiving optical signals in digital form within computers, servers and other devices which communicate over optical networks have been assemblies of discrete components. These assemblies generate digital optical signals from electronic signals and/ or receive digital optical signals to be converted into electronic digital signals. Due to the size and number of components therein, consequently, a resulting assembly is of such a substantial size which then restricts or inhibits the reduction of the size of the assemblies and prevents compact arrangements of a large plurality of connections between the fiber optic network cables and the computer or server. Whenever a plurality of such assemblies are disposed in an external panel of a server or computer housing, the panel may be overly congested. This congestion impedes reliable connection and disconnection of fiber optic cable connectors at the transceivers.

The difficulty in assembly of transceivers and connectors for fiber communication is further exacerbated by the presence of a new standard for connection of fiber optic cables with the optical signal transceivers. This standard requires a 0.75 mm spacing of the optical paths for sending and receiving optical signals; however, this new standard allows the use of a MTRJ fiber optic connector to connect and align the fiber optic conductors to the transceiver elements. MTRJ standards are well-known and industry wide. The 0.75 mm spacing of the fiber optic conductor within a MTRJ fiber optic connector dictates that either the transceiver must be significantly reduced in size or that the transceiver must contain or be associated with complex light path correction and directing optics. Such light path correction and directing optics would have to be critically manufactured, assembled and collimated in order to bring the optical signal light paths into the proper spatial relationship with the fiber optic conductors of the network fiber optic cable. Further, such light path correcting and directing optics may degrade the signal quality and strength causing inadequate transmission or reception of the optical data signals.

If it is not already impractical, continued assembly of the electronic portions of the optical signal transceiver from discrete electronic and opto-electronic components is becoming impractical in the higher density optical connections of computers and servers to optical networks.

Due to the above described factors, a different approach to the fabrication of the optical subassembly is required to permit and maintain the reduced standard spacing between outgoing and incoming optical signal conductors and the corresponding spacing of the transceiver optical components.

OBJECTS OF THE INVENTION

It is an object of the invention that an electronic solid-state chip having both an integral laser and an integral photo receptor at a fixed displacement therebetween is to be incorporated into an optical transceiver subassembly.

It is another object of the invention to further include within an optical transceiver subassembly a monitoring photo-detector on the solid-state electronic chip of the optical transceiver subassembly.

It is a further object of the invention to enclose the solid-state electronic chip in such a manner that a portion of the emitted laser light is directed to a monitoring photo-detector, and the remainder of the laser light is projected as optical signals out of the enclosure to an optical fiber network.

It is still another object of the invention to encapsulate the electronic chip with an over-mold that enables control of the direction and redirection of transmitted and/or received laser light signals.

It is a still further object of the invention to fix relative to each other the active optical elements and the over-mold, thereby insuring reliability and precise collimation and focusing.

It is an additional object of the invention to redirect and utilize a portion of the transmitted laser light for monitoring both the outgoing optical signal and operation of the laser of an optical transceiver unit.

SUMMARY OF THE INVENTION

A solid-state electronic chip incorporating a laser and two photo-detectors is affixed to a lead frame. The lead frame provides support and essential electrical connections to the electronic transceiver chip. The electronic transceiver chip supports or forms a laser cavity and laser therein.

The laser generates optical pulses responsive to electronic signals and directs the short bursts of light outwardly relative to the transceiver chip. The transceiver chip further supports a photo-sensor element. The photo-sensor is disposed at a location 0.75 mm laterally from the outlet end of the laser cavity and alignable with the ends of a pair of fiber optic conductors in a fiber optic cable connector.

The solid-state transceiver chip further incorporates therein a second photo-detector. The second photo-detector is utilized as a feedback monitor from the optical signals of the data stream transmitted over the outgoing fiber optic conductor of the fiber optic network, to replicate an electronic representation thereof for comparison and monitoring by the originating computer, server or electronic system.

After being secured to the lead frame and all electronic connections to the lead frame are made, the transceiver chip is provided with an encapsulating over-mold of a transparent plastic material. This over-mold is multi-functional in that it protects against contamination of or damage to both the emitting surface of the laser and the receiving photosensitive surfaces of the receiving and monitoring photo-detectors.

The over-mold is cast and shaped to perform a plurality of functions. In line with the emitted laser beam, a smooth surface of the over-mold is disposed at an orientation to form a beam-splitter. The smooth planar surface of the beam-splitter passes a portion of the laser beam therethrough and to the end of one of the fiber optic conductors of a fiber optic cable. The planar surface also acts to internally reflect a portion of the laser light emitting from the laser cavity. The smooth, planar surface may be lightly silvered or coated with a partially reflective light beam-splitting layer or coating of highly reflective metal, such as silver or aluminum, sufficient to insure adequate reflection of the laser light beam, yet not coating the smooth planar surface too heavily to block the egress of the remainder of the laser beam.

The over-mold is further provided with a second reflective and focusing surface in the form of a partial cylinder. The exterior surface of the cylindrical surface may be silvered to totally reflect that portion of the laser light beam reflected by the beam-splitter. The natural spread of the laser light beam is preferably refocused to a more densely illuminated, narrow and elongated pattern by the cylindrical concave surface of the reflective silvering material as deposited on the exterior of the cylindrical surface of the over-mold. The refocused light from the cylindrical reflecting surface is directed or focused on the second photo-detector. The second photo-detector serves as a monitor of the data stream sent by the laser over the fiber optic conductor. The electronic output of the second photo-detector may be compared to the input to the laser to detect either anomalies in the data stream, a laser failure, or changes in the emitted optical power.

Additional optical elements may be interposed between the over-mold and the fiber optic conductor end. Such optical elements may include a glass plate, an index of refraction matching material to direct the laser light parallel to the axis of the laser beam emitted by the laser on the transceiver chip and to reduce back reflection from the glass plate.

Moreover, a pair of lenses may be inserted into the transmitted light path at a location proximate to or juxtaposed with the ends of the fiber optic conductors. One of the lenses would focus the transmitting laser beam light onto the end plane of one of the fiber optic conductors for transmission of the optical data stream over the associated fiber optic network. The other lens focuses the incoming light signal from the associated optical fiber onto and through the glass and the index of refraction matching material, and thence onto a photo-detector to receive incoming optical data signals as well as to convert an incoming signal into electronic digital signals useable by the receiving electronic device. The lenses not only insure on-axis launch of the transmitted optical data signals relative to the fiber optic conductor but also the focusing of the incoming signals to insure adequate illumination intensity of the optical signals impinged on the receiving first photo-detector.

This summary of the invention is intended to summarize the basic characteristics of the invention but is not intended to limit the invention in any manner and is not intended to be a complete and detailed disclosure of the invention.

A more complete and detailed understanding of the invention may be derived from the attached drawings and the detailed description of the invention that follows.

DETAILED DESCRIPTION OF THE PREFERRED EMBODIMENT OF THE BEST MODE CONTEMPLATED BY THE INVENTORS FOR CARRYING OUT THE INVENTION

Figure 1:
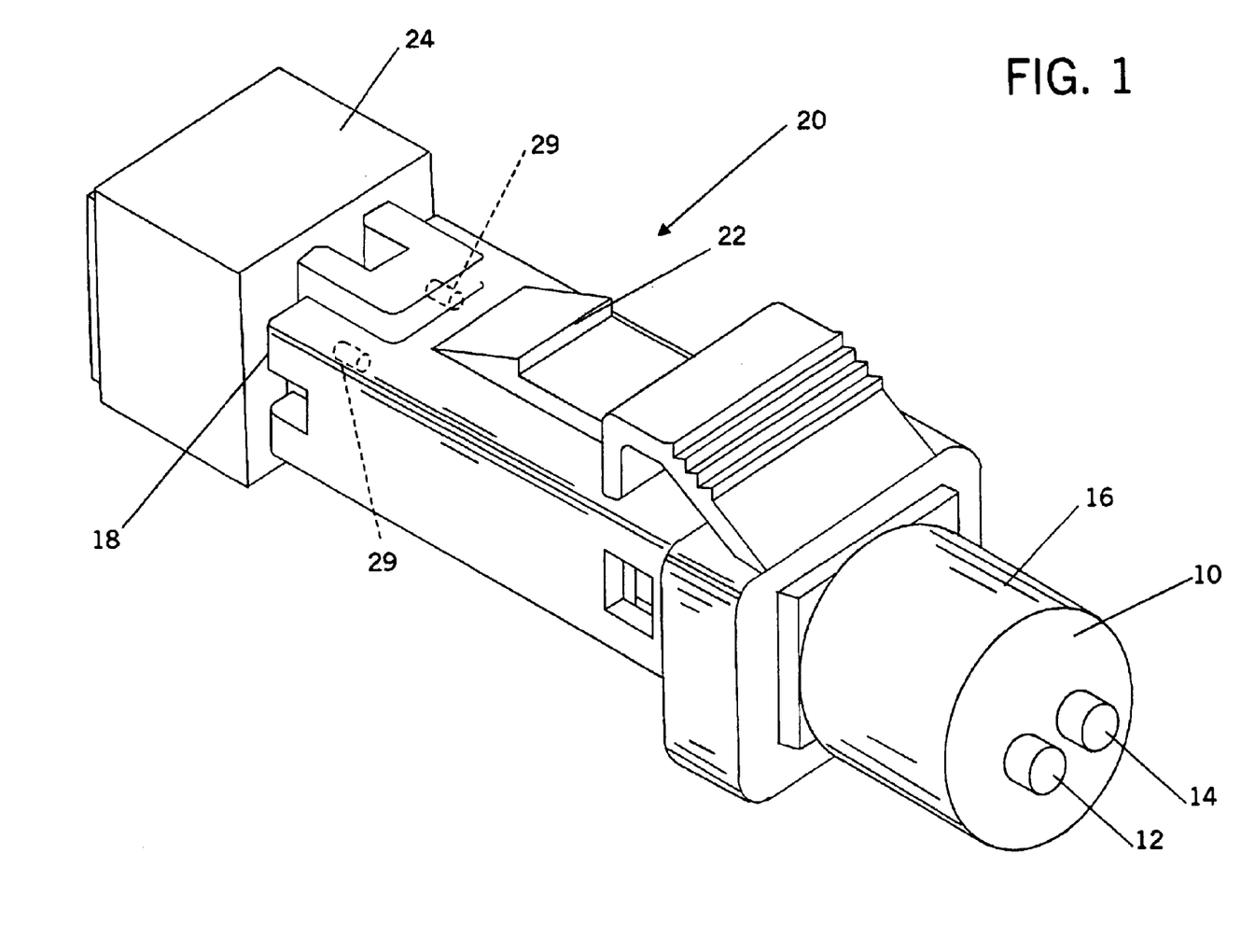
FIG. 1 is a right front isometric view of an MTRJ fiber optic cable connector plug mated with a lead frame assembly for optical signal communication over the fiber optic cable network connected through the fiber optic cable connector plug.

Referring initially to FIG. 1, a fiber optic cable 10, with two optical fibers 12, 14 contained within an external sheath 16, is provided to convey digital optical signals to and from an electronic device, such as a computer or network server (not shown). Optical fibers 12, 14 are terminated at the end 18 of a communications fiber optic cable plug 20. For purposes of illustration and description of the preferred embodiment of the invention, this disclosure and the preferred embodiment incorporate a MTRJ fiber optic cable plug 20. Because the MTRJ plug is manufactured to an industry standard, these MTRJ plugs are interchangeable with other such like plugs without regard to the source or manufacturer. Nevertheless, it must be understood that any style or type fiber optic cable plug may be used in conjunction with the invention; but MTRJ plugs permit a more densely populated array of transceivers and cable connections.

The fiber optic cable connector plug 20 is provided with a latch 22 for engagement with a latching retention surface on the host electronic system housing or parts mounted thereon (neither shown).

The fiber optic cable connector plug 20 mates with an optical subassembly (OSA) 24 which is either resident within a host electronic system or permanently mounted on a circuit board thereof. An optical subassembly 24 provides a structure for mating with and properly positioning the ends of the optical fibers 12, 14 contained within a fiber optic cable connector plug 20. As will be described more fully below this fiber optic cable connector plug 20 maintains the spacing of the optical fibers 12, 14 at the required standard 0.75 mm centerline separation for proper alignment with elements of the optical subassembly 24.

Figure 2:
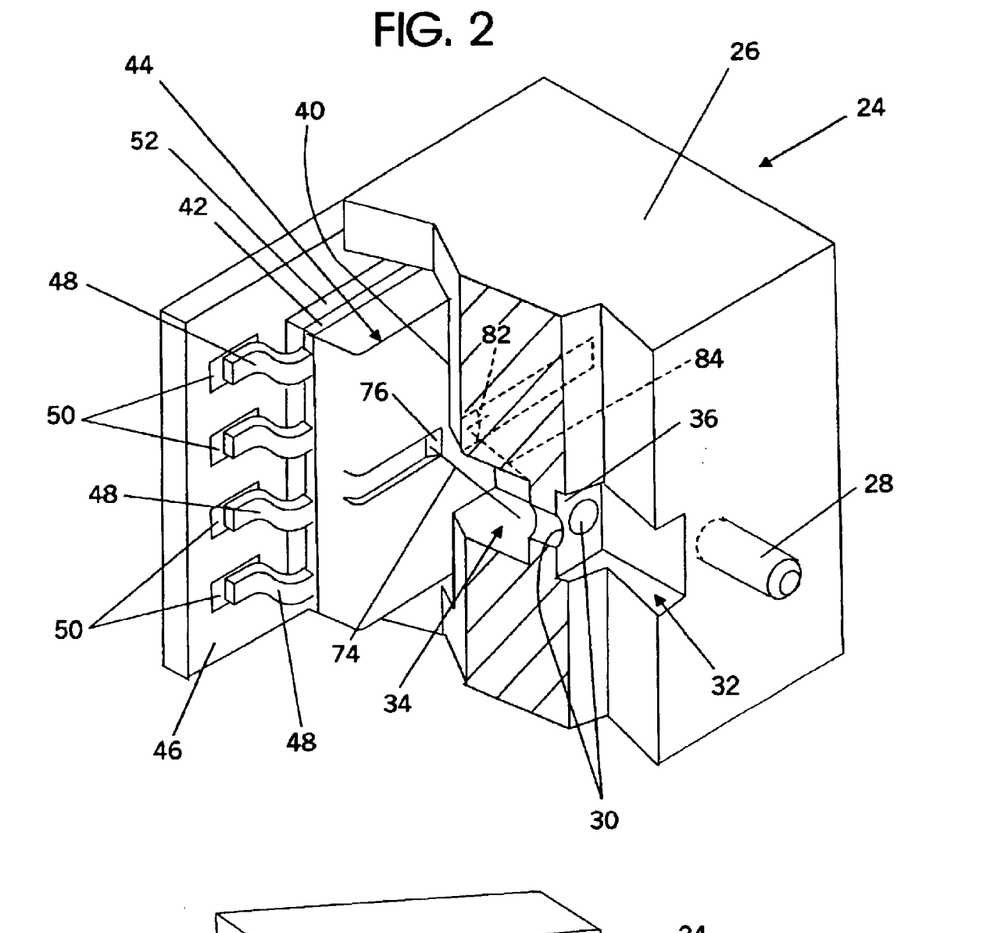
FIG. 2 is an isometric view of the optical subassembly mated with the lead frame and partially cut-away housing, which has alignment optics and alignment pins for mating with the fiber optic cable connector plug illustrated in FIG. 1, the housing encapsulating the optical subassembly.

Refer now to FIG. 2. The optical subassembly housing 26, a part of the optical subassembly 24, includes alignment pins 28 and lenses 30. Due to the cut-away form of the illustration of housing 26 in FIG. 2, only one alignment pin 28, one complete lens, and one partial lens 30 are illustrated. The optical subassembly 24 has a chamber 32 formed in the optical subassembly housing 26. The chamber 32 terminates in a wall 36 or span of material 36 at the back end or bottom of the chamber 32. The span of material 36 is molded or formed in the shape of two lenses 30. The lenses 30 are disposed with a spacing between their respective axes corresponding to the spacing between the optical fibers 12, 14; in this example, the spacing is 0.75 mm.

A similar chamber or passage 34 is formed or molded into the backside 40 of optical subassembly 24, forming the opposite surfaces of lenses 30.

The optical subassembly housing 26 fits over a lead frame 42 and lead frame package 44 to provide the necessary interface between the optical fibers 12, 14 and the lead frame package 44.

Figure 3:
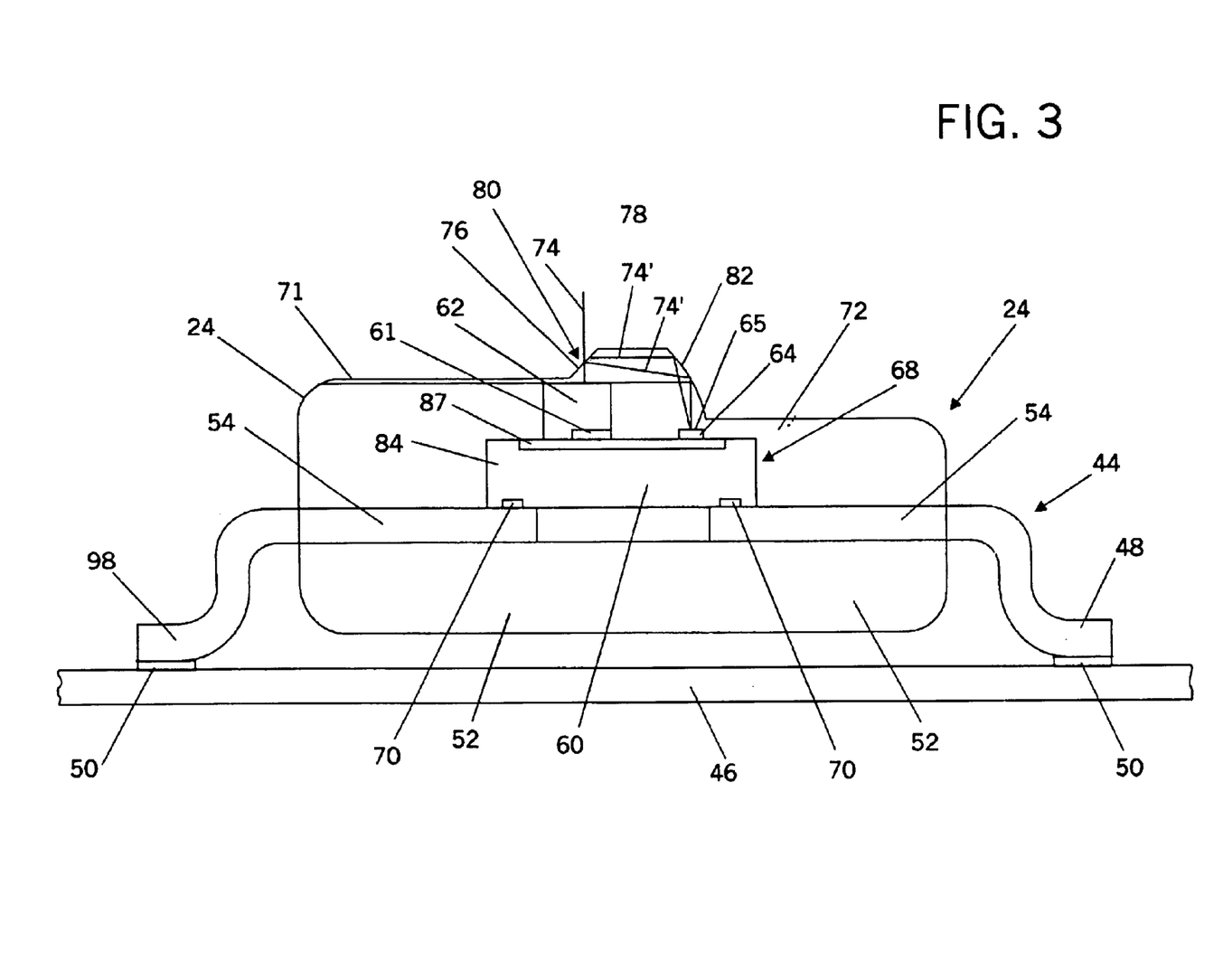
FIG. 3 is a side section view of the optical subassembly of the system illustrating the path of the laser beam to both the fiber optic network and monitoring photo-detector of the optical subassembly.

As can be observed in FIGS. 2 and 3, the lead frame package 44 is supported by and electrically connected to the printed circuit board 46. The electrical connections necessary for operation, control and transmission of data to and from the lead frame package 44 are conductors 48 soldered to solder pads 50. The solder pads 50 terminate internal printed circuit board wiring or surface conductors (not shown) within a printed circuit board 46.

The internal printed circuit board wiring or surface conductors are both conventional and do not constitute any part of the novel aspects of this invention.

The lead frame package 44 includes a substrate layer 52 which supports extensions 54 of leads or conductors 48, as schematically shown in FIG. 3, as well as the solid-state transceiver chip 60. Solid-state optical transceiver chip 60 further includes a solid-state laser 62, monitor photo-detector 64 and a data receiving photo-detector 66. Collectively, the solid-state chip 60 and its components, solid-state laser 62, monitor photo-detector 64 and data receiving photo-detector 66 form a transceiver unit 68.

The electrical connections from contact pads 70 and on the transceiver unit 68 are conventional, such as wire bonds, and do not require detailed description as their construction, fabrication and connections are conventional and within the skill in the art of chip and solid-state electrical component design and manufacture.

The top surfaces 71 of the optical subassembly 24 are molded to form a protective cover 72, while at the same time providing optical manipulation of a portion of the laser beam 74. The protective cover or over-mold 72 of the optical subassembly 24 is typically molded using a polycarbonate material. Polycarbonate is desirable due to its transparency, easy molding characteristics, and its index of refraction being substantially equal to the index of refraction of the other optical components of the lead frame optical subassembly 24, thereby minimizing optical index of refraction mismatches.

The over-mold 72 is formed to present a planar smooth surface 76 to a laser light beam or ray 74 from laser 62 oriented at approximately 41° to the axis central ray of laser beam 74. This surface 76 is lightly or partially coated with a highly reflective metal coating 78. The resulting structure of the planar surface 76 and reflective coating 78 is a structure also commonly referred to as a beam-splitter 80. The function of a beam-splitter 80 is to divide the light beam 74 impinged on the interior or first surface 76 of reflective metal coating 78, and permit a portion of the light or laser beam 74 to pass therethrough while, at the same time, reflecting the balance of the light or laser beam 74. The beam-splitter silvering or reflective coating 78 is intentionally very light to reflect only a portion of the light 74 impinged thereon.

The over-mold 72 is formed to further provide a partial cylindrical surface 82 with its axis 84 parallel to the plane of the beam-splitter 80. The radius of the surface 82 and the location of the axis 84 is chosen to focus and reflect the reflected portion 74' of laser beam 74 onto the photo sensitive surface 65 of photo-detector 64. The partial cylindrical surface 82 acts as a reflective lens and focuses the reflected laser beam 74' into an elongated light pattern and to the photosensitive surface 65 of photo-detector 64 in a pattern having some length and breadth greater than the length and breadth of a foci of a perfectly focused beam of light. This resulting pattern of light is large enough in area that the intensity of the reflected laser beam 74' does not damage photo-detector 64 and also provides light input over a sufficiently large area to allow the photo-detector 64 to sense any light signal input and generate a corresponding electrical signal. This may be accomplished by placing the cylindrical, fully reflective surface lens 82 at a very small displacement from the location at which the reflected laser beam 74' would be focused into a spot or line at the focal plane (not shown) of the reflective surface lens 82.

Figure 4:
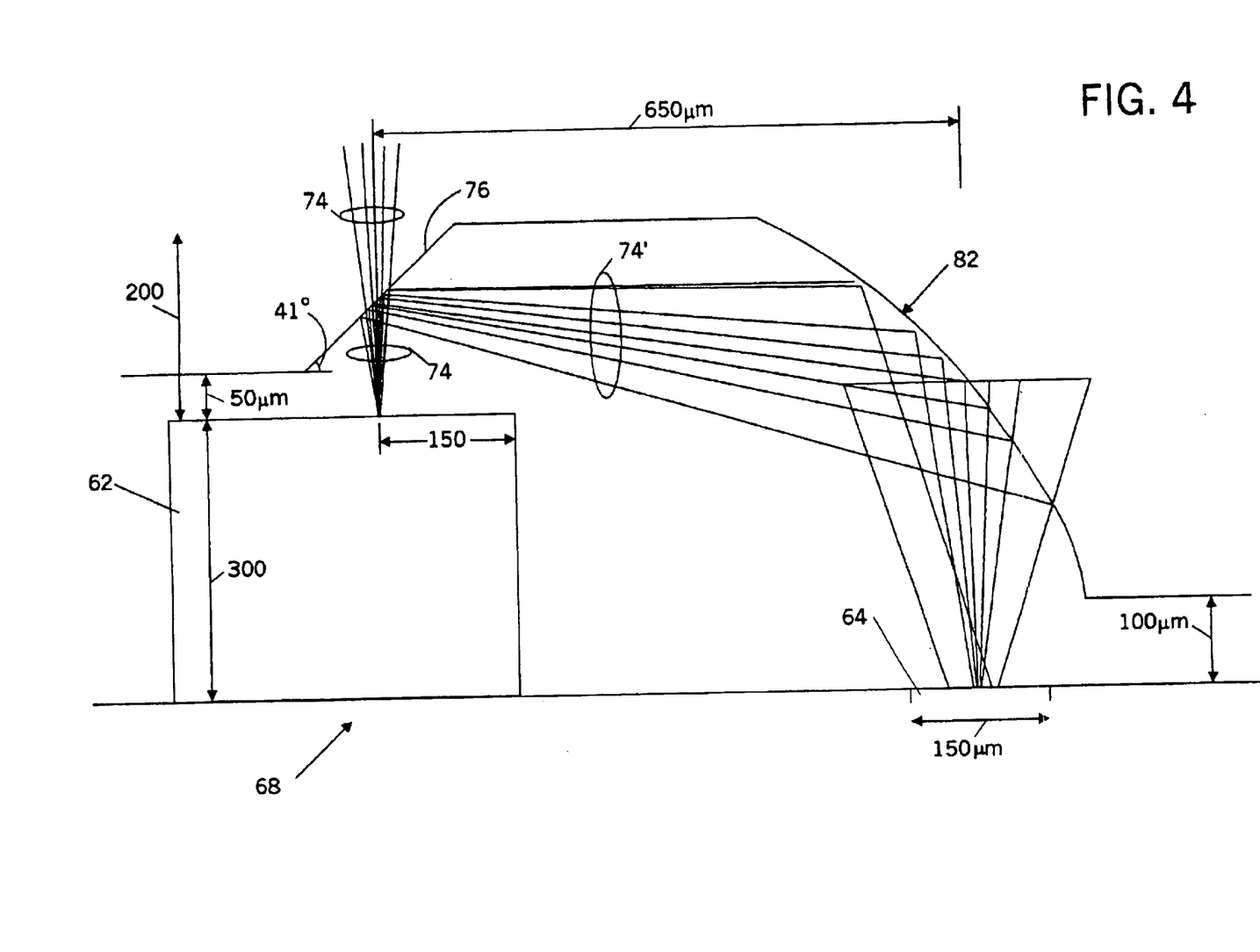
FIG. 4 is an enlarged diagram of the transmit ray traces within the over-mold of the optical subassembly.

FIG. 4 illustrates an enlarged diagram of a portion of the transceiver unit 68, ray traces for the laser beam 74 and reflected laser beam 74', the laser 62, both reflective surfaces 76 and 82 as well as the monitoring photo-detector 64 as described above.

Figure 5:
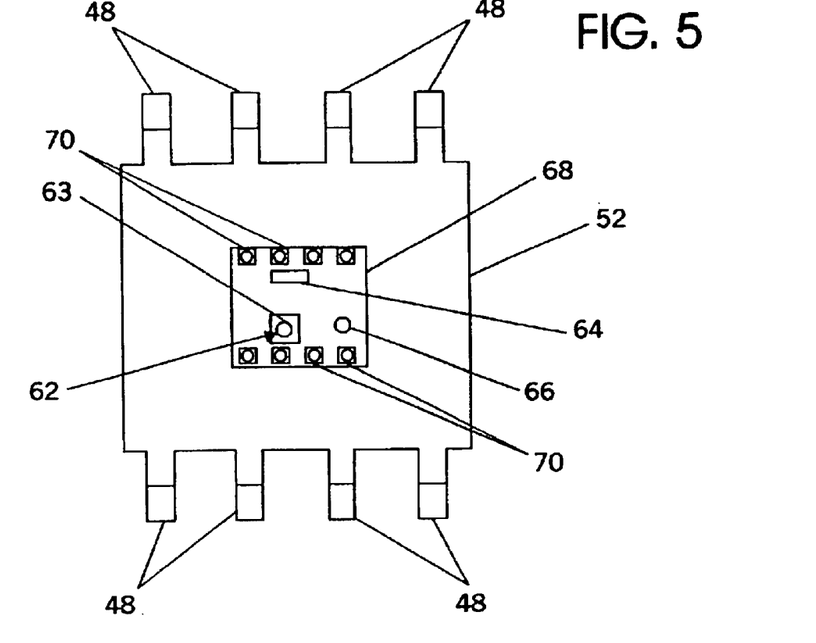
FIG. 5 is a plan section view of the top of the lead frame with the solid-state optical signal transceiver chip mounted thereon, illustrating the locations of the laser, the data receiving photo-detector, and the laser monitoring photo-detector.

Refer now to FIG. 5, where the substrate layer 52 is illustrated supporting transceiver unit 68. The laser 62 is shown with the laser aperture 63 positioned in line with data receiving photo-detector 66, so that when assembled with the over-mold 72 (not shown in FIG. 5), both the laser aperture 63 and the data receiving photo-detector 66 are spaced to match the spacing of the fibers, 0.75 mm for an MTRJ case. The transmit beam splitter 76 is placed over the laser aperture to split the transmit beam. Similarly, the monitoring photo-detector 64 is disposed under the partial cylindrical surface reflecting lens 82 to receive the reflected portion 74' of laser beam 74, discussed above with reference to FIG. 3.

Figure 6:
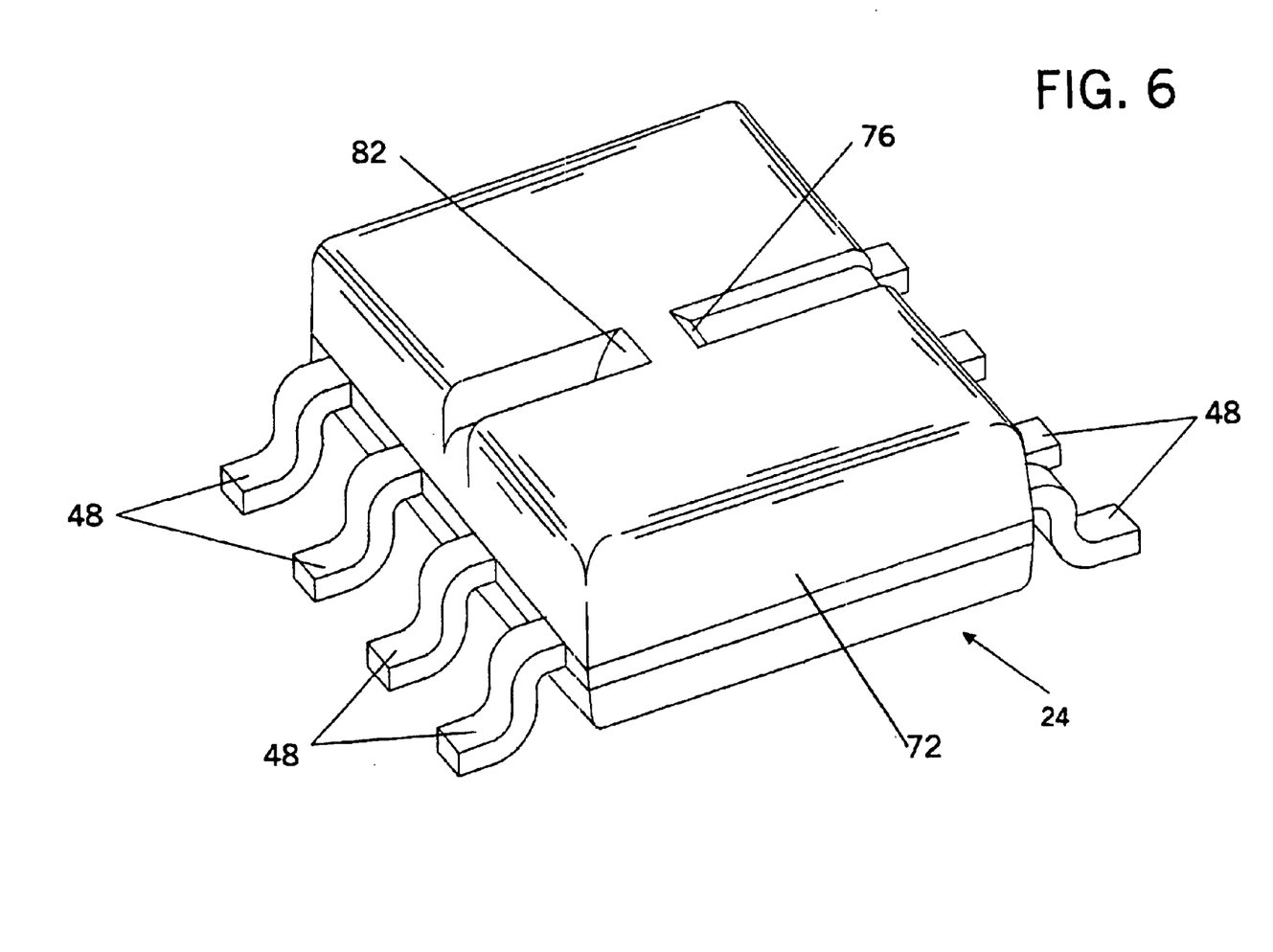
FIG. 6 is an isometric view of the lead frame assembly with the over-mold disposed over the optical subassembly and joined to the lead frame.
Figure 7:
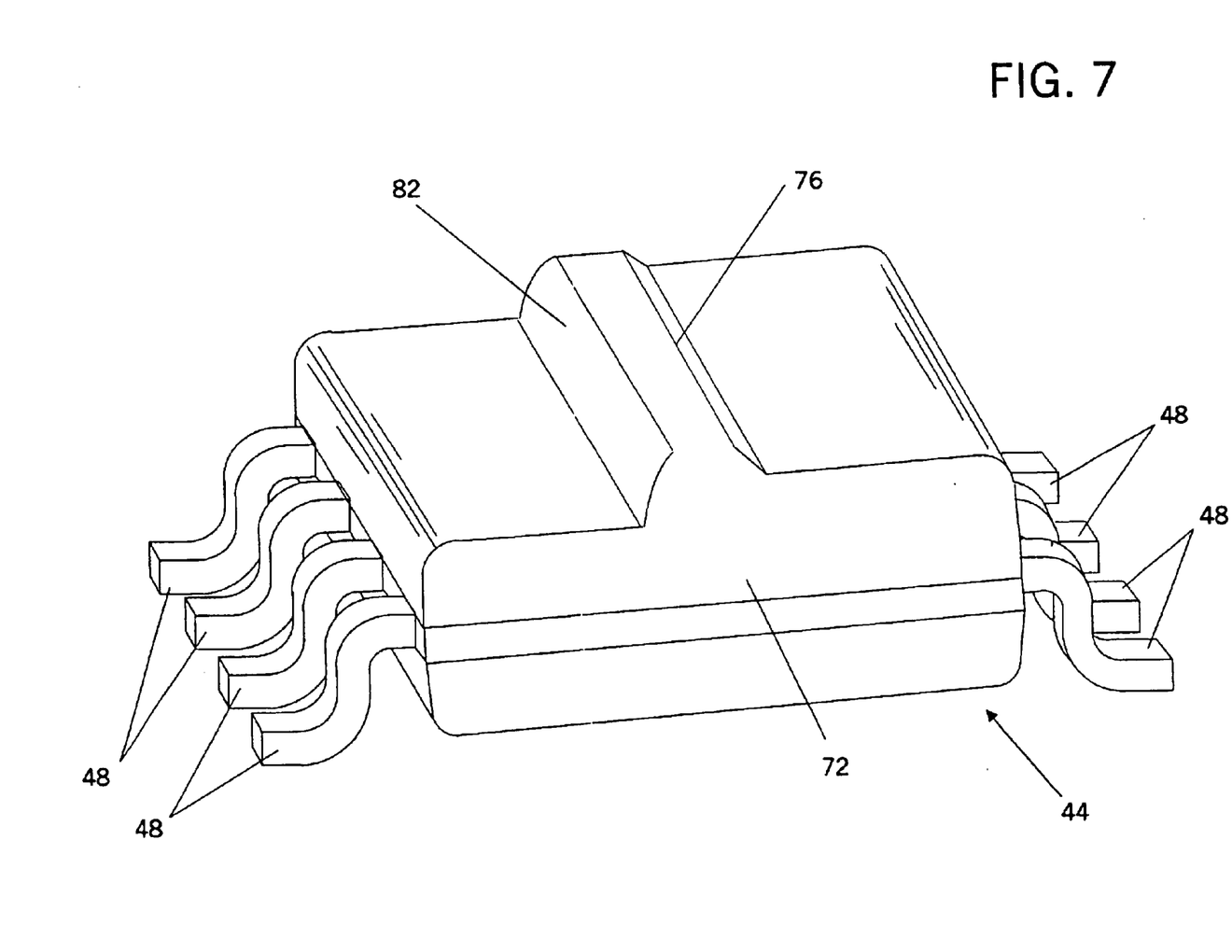
FIG. 7 is an isometric view of the lead frame assembly with a second embodiment of the over-mold disposed over the optical subassembly and joined to the lead frame.

FIG. 6 shows one embodiment of the lead frame package 44. The planar reflective surface forming the mirror 76 and the partial cylindrical focusing surface 82 are illustrated in a shortened length; however in FIG. 7, the reflective surfaces 76, 82 extend across the entire width of the over-mold 72. The embodiment in FIG. 7 is such that it may be possible to include multiple transceiver units 68 (not shown in FIG. 7) within a single lead frame assembly 44, requiring only the addition of additional transceiver units 68 and leads 48 to accommodate the additional data flow.

Figure 8:
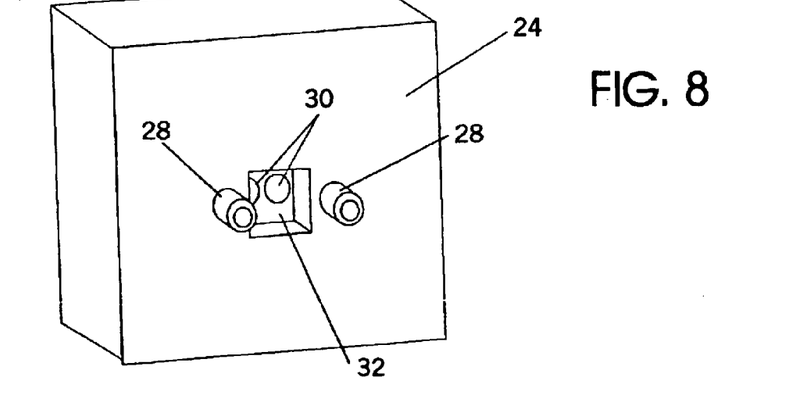
FIG. 8 is an isometric illustration of the optical subassembly housing having the alignment pins and the lens structure necessary for aligning both the optical fibers and the fiber optic conductor connector plug with the paths of the optical data signals as these signals are sent and/or received by the optical subassembly.

As may be readily seen in FIG. 8, the lead frame optical subassembly 24 of FIG. 2 is fitted over the lead frame package 44. The lead frame optical subassembly 26 is manufactured such that it slips over the over-mold 72 and simultaneously aligns the lenses 30 with the path of laser beam 74 and the data laser signal (not shown) being received from the MTRJ fiber optic cable plug 20 described in connection with FIG. 1. Alternatively, the lead frame optical assembly 24 may be activated, aligned, and fixed to optical assembly 26.

FIG. 8 shows the lead frame optical subassembly 24 with the guide pins 28, chamber 32 and lenses 30, which align with the cable plug 20. The guide pins 28 fit within recesses 29 (as seen in FIG. 1) in MTRJ fiber optic connector plug 20 to properly align the optical elements as previously described.

Figure 9:
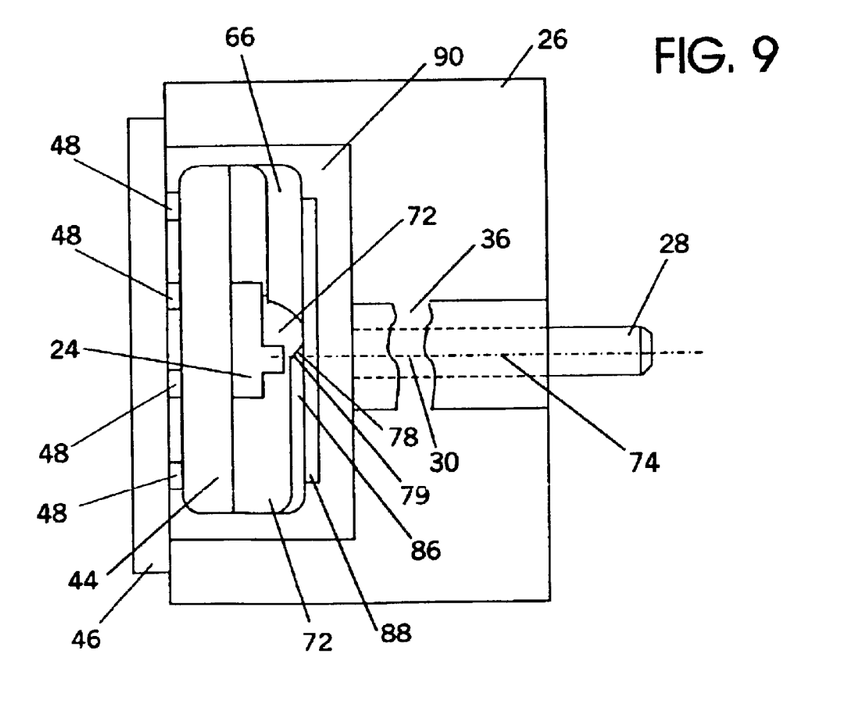
FIG. 9 is a sectioned view of a printed circuit board, the lead frame, the optical subassembly, and the optical subassembly housing assembled and prepared for installation

Refer now to FIG. 9. A section view of the lead frame optical subassembly 24 and the optical subassembly housing 26 are mated. Captured between the over-mold 72 and the optical subassembly housing 26 is a glass cover plate 88. The purpose of the glass cover plate 88 is to provide a light transfer medium with parallel surfaces intermediate the over-mold and the lenses 30.

At least the cavity 86 between the planar reflective surface 78 and glass plate 88 is preferably filled with a silicone material, such as a transparent silicone grease or fluid 90, having an index of refraction substantially equal to the indices of refraction of the over-mold 72 and the glass 88.

With little deviation in direction, the light beam 74 is thus impinged on the lens 30 which then will refocus the beam 74 onto the end of the fiber optic conductor 18 in the MTRJ fiber optic cable plug 20 of FIG. 1.

The alignment pins 28 in FIG. 9 have been discussed above with reference to FIGS. 1 and 8.

Digital electrical signals from the electronic host (not shown) of which this invention is a part will cause the laser 62 to lase and produce a digitally modulated light output under electronic control from the host device. The resulting digitally modulated light output in the form of laser beam 74 is manipulated by the beam-splitter 80, silicone fluid 90, glass cover 88 and one associated lens 30 to fall on the terminal end of the optical fiber 12, thereby providing the connection and transmission of digital optical data onto a fiber optic cable network.

The beam-splitter 80 redirects a portion 74' of the laser beam 74, onto a reflective surface of a cylindrical member or cylindrical lens 82 which, in turn, directs and focuses for internal use the reflected laser beam portion 74' described above onto a monitoring photo-detector 64 both to create a digitally modulated electronic data stream and provide the host system an exact electronic version of the data stream provided to the laser 62 and transmitted over the fiber optic cable 10 in the form of digitized optical signals. If desired, the output of the monitoring photo detector 64 may be electronically compared for accuracy to the data stream input to the laser 62 or to monitor the emitted optical power.

The assembly illustrated in FIG. 9 benefits from the containment of the lead frame package 44, the over-mold 72, the glass cover plate 88, and the silicone 90 by the optical subassembly housing 26 and printed circuit board 46. The optical subassembly housing 26 may be attached to the printed circuit board 46 about their respective perimeters by adhesive, an epoxy bonding agent or ultrasonic bonding, or any other suitable attachment technique. The primary purpose of such attachment is to maintain alignment of lenses 30 with the laser light beam 74 emanating from mirror 78 and the light path of the data laser beam (not shown) with the data receiving photo detector 66.

However, a secondary, but still very important reason for attaching the optical subassembly housing 26 to the printed circuit board 46 is to prevent dust and foreign particle contamination of the various optical components and, particularly, the mirror entrance/exit surface 79.

A mating MTRJ cable plug is not shown in detail, being an industry standard plug and readily available from many fiber cable suppliers This Detailed Description of the Invention is not intended to limit the invention in any manner and is exemplary of the best mode for implementing the invention. Other embodiments of the invention will become apparent to those of skill in the art and are intended to encompassed by the scope of the attache claims.

It should be further understood that modification and changes to the invention may be made by one of skill in the art without so changing the result that the changed item is removed from the scope of the attached claims, which define the scope and extent of the invention.

We claim:

1. A transceiver optical subassembly comprising:
   a printed circuit board having a plurality of electrical connection points thereon;
   a lead frame comprising a plurality of electrical leads connected to said connection points;
   a solid-state laser connected to selected ones of said plurality of electrical leads;
   a first photo-detector connected to selected ones of said plurality of electrical leads; and
   a molded transparent cover member for enclosing said lead frame, said laser and said first photo-detector, said cover member defining an inclined planar surface and a partially cylindrical surface,
   wherein said inclined planar surface is disposed in a path of emitted light from said laser and has a partially reflective/partially transmissive coating for separating the emitted light into a first beam passing through said cover member along a first optical path and a second beam of reflected light; and
   wherein said partially cylindrical surface has a reflective coating for focusing and reflecting said reflected light onto a photo-sensitive surface of said first photo-detector providing an electronic representation of optical signals created by said laser;
   whereby electrical signals supplied to said laser through said electrical leads control the lasing of said laser.

2. The transceiver optical subassembly of claim 1 further comprising a second photo-detector disposed adjacent said inclined planar surface with a second unobstructed optical path parallel to said first optical path.

3. The transceiver optical subassembly of claim 2, further comprising a pair of lenses disposed in and aligned with said first and second optical paths, respectively.

4. The transceiver optical subassembly of claim 3, further comprising a transparent glass member disposed intermediate said inclined planar surface and said lenses, said transparent glass member substantially perpendicular to a central ray of said light exiting said inclined planar surface.

5. The transceiver optical subassembly of claim 3 further comprising a cover enclosing a transparent member having a pair of parallel surfaces, said parallel surfaces perpendicular to a central ray of said light exiting said inclined surface.

6. The transceiver optical subassembly of claim 4, further comprising a subassembly housing disposed over and enclosing said laser, said photo-detectors, said inclined planar surface, said cylindrical surface, and said glass member.

7. The transceiver optical subassembly of claim 6, wherein said subassembly housing incorporates said pair of lenses in a fixed position relative to said laser and said second photo-detector.

8. The transceiver optical subassembly of claim 6 further comprising at least one alignment member compatibly positioned to engage a mating plug, whereby said lenses may be aligned with optical elements of said plug.

9. The transceiver optical subassembly of claim 8, wherein said at least one alignment member comprises a pair of pins disposed within and extending from said subassembly housing.

10. The transceiver optical subassembly of claim 9 wherein said transceiver optical subassembly is assembled and sealed into a unitary structure.

11. The transceiver optical subassembly of claim 5, further comprises transparent fluid having an index of refraction substantially equal to said indexes of refraction of materials of which said inclined planar surface and said transparent member are fabricated, said transparent fluid disposed intermediate said inclined planar surface and said transparent member.

* * * * *